United States Patent
Miyazoe et al.

(12) 
(10) Patent No.: US 6,612,332 B2
(45) Date of Patent: Sep. 2, 2003

(54) SOLENOID VALVE HAVING SENSOR

(75) Inventors: Shinji Miyazoe, Ibaraki (JP); Makoto Ishikawa, Ibaraki (JP)

(73) Assignee: SMC Corporation, Tokyo (JP)

( * ) Notice: Subject to any disclaimer, the term of this patent is extended or adjusted under 35 U.S.C. 154(b) by 68 days.

(21) Appl. No.: 10/028,764

(22) Filed: Dec. 28, 2001

(65) Prior Publication Data

US 2002/0092570 A1 Jul. 18, 2002

(30) Foreign Application Priority Data

Jan. 16, 2001 (JP) ........................................ 2001-008059

(51) Int. Cl.[7] .............................................. F16K 37/00
(52) U.S. Cl. ........................ 137/552; 137/554; 137/557; 137/884
(58) Field of Search ................................ 137/552, 554, 137/557, 884, 625.69

(56) References Cited

U.S. PATENT DOCUMENTS

| | | | | |
|---|---|---|---|---|
| 3,513,876 A | | 5/1970 | Tarbox | |
| 4,150,686 A | * | 4/1979 | El Sherif et al. | 137/557 |
| 4,687,021 A | * | 8/1987 | Ise et al. | 137/557 |
| 5,165,596 A | * | 11/1992 | Le Mer | 137/557 |
| 5,806,565 A | | 9/1998 | Kadlicko | |
| 5,810,115 A | * | 9/1998 | Mismas | 137/557 |
| 5,819,783 A | * | 10/1998 | Blatt et al. | 137/552 |
| 6,035,609 A | * | 3/2000 | Evans et al. | 137/557 |
| 6,065,494 A | * | 5/2000 | Thomsen et al. | 137/552 |
| 6,505,642 B2 | * | 1/2003 | Miyazoe et al. | 137/554 |

* cited by examiner

*Primary Examiner*—John Rivell
(74) *Attorney, Agent, or Firm*—Oblon, Spivak, McClelland, Maier & Neustadt, P.C.

(57) ABSTRACT

To provide a solenoid valve having a sensor in which monitor devices for monitoring whether input or output pressure in the solenoid valve is appropriate and a switching state of a valve body are collected to simplify the structure and to facilitate the assembling operation, thereby enhancing safety and reliability.

A solenoid valve having a sensor comprises a solenoid valve 1, a base 2 for supplying and discharging pressurized fluid to and from ports P, A, B, EA and EB of the solenoid valve 1, and an intermediate block 3 disposed between the solenoid valve 1 and the base 2. The intermediate block 3 is provided with communication passages 53, 54A, 54B, 55A and 55B for respectively bringing the ports of the solenoid valve and flow paths of the base into communication with each other. A conduit 56 crossing the communication passages is provided in the intermediate block 3. A pressure introducing port 58 opening at the communication passage 53 whose pressure is to be detected is formed in the conduit. A pressure sensor 60 for detecting pressure introduced through the conduit is provided in the intermediate block 3.

5 Claims, 2 Drawing Sheets

SOLENOID VALVE HAVING SENSOR

TECHNICAL FIELD

The present invention relates to a solenoid valve having a sensor capable of monitoring whether input or output pressure in the solenoid valve is appropriate or a switching state of a valve body.

PRIOR ART

Conventionally, a solenoid valve is provided with a sensor for monitoring whether input or output pressure in the solenoid valve is appropriate or a switching state by a valve body. The sensors are individually provided if necessary, and they are not uniformly provided for the entire apparatus, the assembling becomes complicated, there is an adverse possibility of error wiring, and it is difficult to secure safety and reliability.

DISCLOSURE OF THE INVENTION

It is an object of the present invention to provide a solenoid valve having a sensor in which monitor devices for monitoring whether input or output pressure in the solenoid valve is appropriate and a switching state of a valve body are collected to simplify the structure and to facilitate the assembling operation, thereby enhancing safety and reliability.

To achieve the above object, the present invention provides a solenoid valve having a sensor comprising a solenoid valve having a valve member for switching a flowing direction of pressurized fluid, a base having a plurality of flow paths for supplying and discharging pressurized fluid to and from ports of the solenoid valve, and an intermediate blocked is posed between the solenoid valve and the base, wherein the intermediate block is provided with a plurality of communication passages for respectively bringing the ports of the solenoid valve and the flow paths of the base into communication with each other, a conduit is provided at a position crossing the communication passages, a pressure introducing hole is provided in the conduit, a pressure introducing port which is in communication with the communication passage whose pressure is to be detected, and a pressure sensor for detecting pressure introduced in the pressure introducing hole through the pressure introducing port are provided in the pressure introducing hole.

In the solenoid valve having a sensor according to the present invention, a passage through which a conductive wire is inserted is provided in the conduit of the intermediate block. A magnet is provided in the valve member of the solenoid valve, a magnetic sensor for detecting the magnet is provided in the intermediate block, a signal line connected to the magnetic sensor is inserted into a passage for the conductive wire. In this case, the intermediate block is provided with an indicator for indicating an operational failure of the valve member based on output of the magnetic sensor.

In a preferred embodiment of the present invention, the intermediate block includes an intermediate block body and a first and second housings continuously formed on the intermediate block body, the intermediate block body is provided with a communication passage, a conduit and a pressure sensor, the first housing is provided therein with a relay terminal for electrically connecting the solenoid valve and the base with each other, and signal transmitting means for transmitting output signals of the pressure sensor and the magnetic sensor to outside, and the second housing is provided therein with the magnetic sensor.

In the solenoid valve having a sensor of the above-described structure, monitor devices such as the pressure sensor, magnetic sensor and the like for monitoring whether input or output pressure in the solenoid valve is appropriate and a switching state of the spool are collected in the intermediate block provided between the solenoid valve and the base. Therefore, a structure for providing the monitor devices is simplified, possibility of erroneous wiring, erroneous assembling and the like is remarkably lowered, and assembling operation is facilitated which is economic. Since the monitor devices are sandwiched between the solenoid valve and the base by the intermediate block, the monitor devices are protected, and safety and reliability can be enhanced.

DETAILED DESCRIPTION

Figure 1:
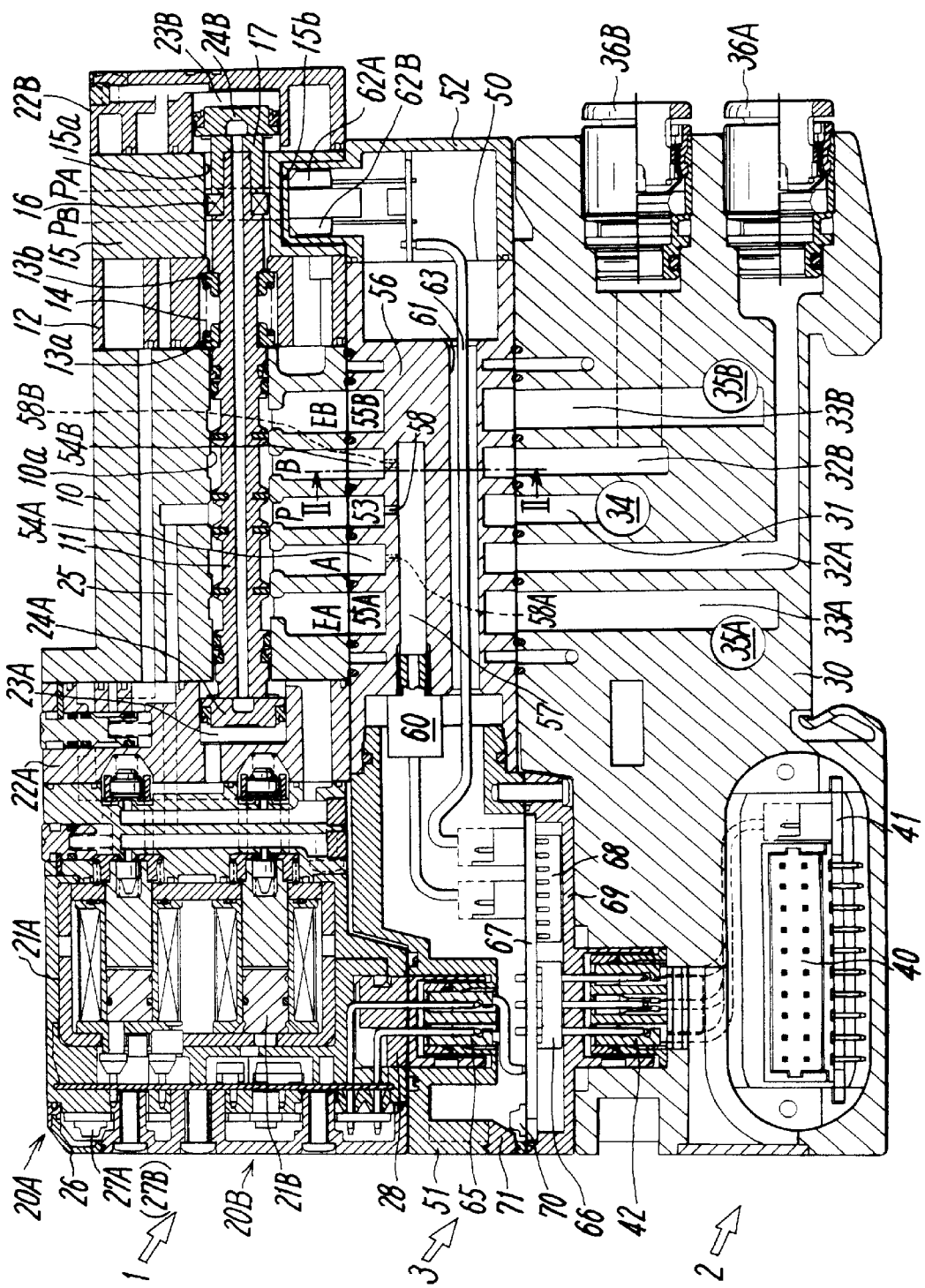
FIG. 1 is a vertical sectional view of an embodiment of a solenoid valve having a sensor according to the present invention.
Figure 2:
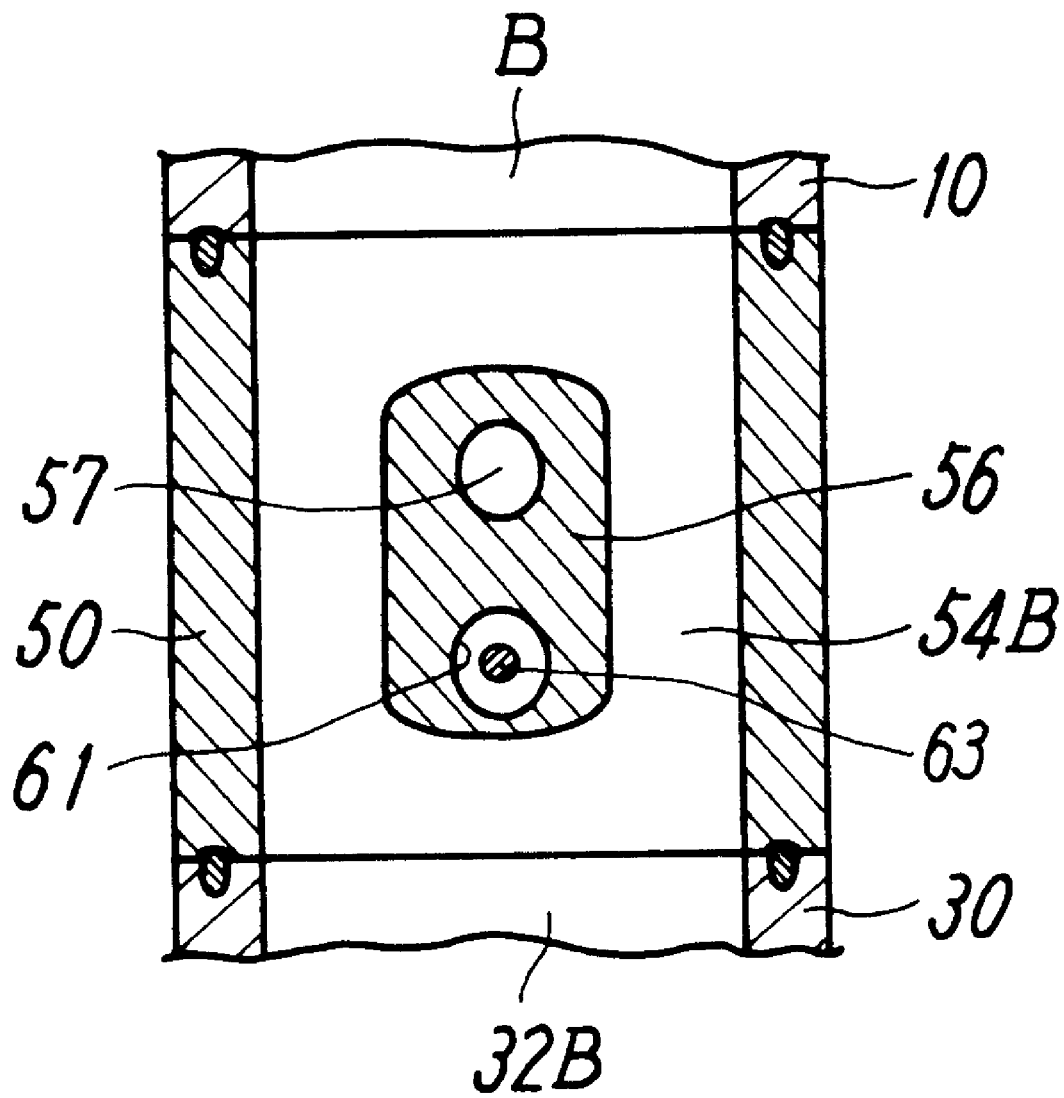
FIG. 2 is a sectional view taken along a position II—II in FIG. 1.

FIGS. 1 and 2 show an embodiment of a solenoid valve having a sensor according to the present invention. The solenoid valve having the sensor comprises a solenoid valve 1 for switching a flowing direction of pressurized fluid (compressed air), a base 2 having flow path for supplying and discharging the pressurized fluid to each port of the solenoid valve 1, and an intermediate block 3 disposed between the solenoid valve 1 and the base 2 and provided with various monitor devices.

In the solenoid valve 1, a valve hole 10a passes through a valve casing 10. A supply port P, first and second output ports A and B and first and second discharge port EA and EB are opened at the valve hole 10a. A spool 11 is slidably inserted in the valve hole 10a as a valve member for switching the flow path between the ports. The spool 11 is known as being used for the solenoid valve. If the spool 11 moves toward one end or the other end of the solenoid valve in its axial direction, the supply port P is switched to first or second output port A or B to bring the supply port P into communication with one of the output ports and at the same time, the other output port which was not brought into communication with the supply port P is brought into communication with the first or second discharge port EA or EB.

The shown solenoid valve is a three-position valve having a neutral stop position for keeping each port in its closed state. Therefore, an auxiliary block 12 is continuously connected to one end of the valve casing 10, a stopper 13a engaging one of recesses of the spool 11 and the valve casing 10, as well as a stopper 13b engaging the other recess of the spool 11 and the auxiliary block 12 are provided in the auxiliary block 12. A spring 14 is compressed between these stoppers. In a state in which a driving force is not generated in the spool 11 by the pilot fluid pressure acting on opposite ends of the spool 11, both the stoppers 13a and 13b are kept in the illustrated neutral stop position where the stoppers engage the valve casing 10 or the auxiliary block 12.

The solenoid valve 1 need not always be the above-described three-position valve, and it maybe a two-position valve having no neutral stop position.

The spool 11 is loosely inserted into an insertion hole 15a of a spacer 15. The spacer 15 abuts against the auxiliary block 12 in the solenoid valve 1. A ring-like magnet 16 is fitted over the spool 11 such that the ring-like magnet 16 is located inside the insertion hole 15a of the spacer 15. The ring-like magnet 16 detects a position of the spool 11 together with a later-described magnetic sensor. The magnet 16 is fixed to the spool 11 by a cap 17 mounted to an end of the spool 11 such that when the spool 11 is located in the illustrated neutral stop position, the magnet 16 is located at substantially central portion in the insertion hole 15a of the spacer 15.

The solenoid valve 1 is provided with pilot valves 20A and 20B that are driven by a pair of solenoids 21A and 21B so as to drive the spool 11 by pilot fluid pressure. Pistons 24A and 24B abut against ends of the spool 11 in piston chambers 23A and 23B in piston blocks 22A and 22B to which the opposite ends of the spool 11 are fitted. The pilot valves 20A and 20B supply and discharge fluid of the pilot supply passage 25 which is in communication with the supply port P of the valve casing 10 to and from the piston chambers 23A and 23B by driving force of the pilot spool caused by solenoids 21A and 21B.

That is, if the solenoid 21A of the pilot valve 20A is energized, the pilot fluid pressure of the pilot supply passage 25 is introduced into the piston chamber 23A by the switching of the pilot spool, the pilot fluid pressure is applied to the piston 24A and the spool 11 moves rightward in the drawing and the flowpath in the valve casing 10 is switched. If the solenoid 21A is de-energized and the solenoid 21B is energized, pilot fluid pressure in the piston chamber 23A is discharged, pilot fluid pressure in a supply passage 25 is introduced in the piston chamber 23B and the pressure is applied to the piston 24B, the spool 11 moves leftward in the drawing, and the flow path in the valve casing 10 is switched.

Both the solenoids 21A and 21B are not energized, the spool 11 is kept in the neutral stop position by the spring 14.

An outer cover of the pilot valves 20A and 20B is provided with an indication window 26. Pilot lamps 27A and 27B for indicating the energization state to the solenoids 21A and 21B are arranged in parallel behind the indication window 26. The pilot lamps 27A and 27B may be a single pilot lamp, and may indicate the actuation of the solenoids 21A and 21B using two color-light emission.

An electricity-receiving terminal 28 is provided between bonded surfaces of the solenoid valve 1 and the intermediate block 3. The electricity-receiving terminal 28 receives electricity sent to the solenoids 21A and 21B through an electricity-supplying terminal.

The base 2 is formed as a manifold corresponding to one solenoid valve 1. The base 2 comprises a plurality of base bodies 30, which are continuously connected with each other and used. Each base 30 is provided with a supply passage 31, output passages 32A and 32B and discharge passages 33A and 33B respectively corresponding to ports P, A and B, EA and EB of the solenoid valve 1. Among these passages, in order to bring the supply passages 31 into communication with each other, bring the discharge passages 33A to each other, and bring the discharge passages 33B into communication with each other through had adjacent bases 2, a supply hole 34, discharge holes 35A and 35B are formed between the supply passages 31, the discharge passages 33A and 33B, such as to penetrate the bases 2 there between. The output passages 32A and 32B are individually opened at an end surface of the base 2, and quick couplings 36A and 36B for connecting piping tubes are mounted to the output passages 32A and 32B, respectively.

Connectors 40 are provided on continuously connected surfaces of opposite sides of the base 30. When the plurality of bases 2 are connected to each other, the connectors 40 are connected to each other for supplying electricity and transmitting signals between the bases 2. The connector 40 is electrically connected to a connection terminal 42 which is connected to a connection terminal of the intermediate block 3 through a signal processing printed board 41. The printed board 41 receives a signal transmitted from adjacent base through the connector 40, and when electricity is supplied to the solenoid 21A or 21B in the mounted solenoid valve 1 based on the signal, the printed board 41 controls such as supply electricity required for such energizing circuits, and controls such as to transmit, to a control unit through the connector 40, an output of a later-described sensor which monitors a propriety of input/output pressure for the solenoid valve 1 or a switching state of the spool 11.

The intermediate block 3 includes an intermediate block body 50 first and second housings 51 and 52 continuously formed on opposite ends of the intermediate block body 50. The intermediate block 3 is sandwiched between the solenoid valve 1 and the base 2. Upper and lower surfaces of the intermediate block 3 include bonding surfaces, which conform to bonding surfaces of the solenoid valve 1 and the base 2.

The intermediate block body 50 includes, between bonding surfaces of the solenoid valve 1 and the intermediate block body 50 and between bonding surfaces of the base 2 and the intermediate block body 50, communication passage 53, 54A and 54B, 55A and 55B for bringing the ports P, A and B, EA and EB of the solenoid valve 1 and the flow paths 31, 32A and 32B, 33A and 33B of the base 2 with each other. As shown in FIG.2, the intermediate block body 50 is also provided therein with a conduit 56 formed such that the conduit 56 does not hinder the flow of fluid in each of the communication passages 53, 54A and 54B, 55A and 55B. A pressure introducing hole 57 is formed in the conduit 56 in its necessary range, and a conductor passage 61 passes through the conduit 56.

The pressure introducing hole 57 in the conduit 56 is formed from one end of the intermediate block body 50 to a position corresponding to the communication passage 54B, but can be formed to a position corresponding to the communication passage 53 or the communication passage 54A. A pressure introducing port 58 is opened from the pressure introducing hole 57 toward a communication passage whose pressure is to be detected. Although the pressure introducing port 58 is opened in the communication passage which is in communication with the supply passage 31 in the illustrated example, if pressure (pressure of output port A or B) of the communication passage 54A or 54B is to be detected, a pressure introducing port 58A or 58B may be provided instead of the pressure introducing port 58. In this case, in order to make is possible to detect pressure of arbitrary communication passage by selectively forming the pressure introducing port in the pressure introducing hole 57 from any one of the communication passages 53, 54A and 54B, it is preferable that the pressure introducing hole 57 reaches a position corresponding to the communication passage 54B as illustrated.

In the intermediate block body 50, a pressure sensor 60 for detecting pressure introduced through the pressure introducing hole 57 is provided at an opening end of the pressure introducing hole 57.

A passage 61 extending from one end of the conduit 56 to the other end thereof is provided in the conduit 56 in the intermediate block body 50 in parallel to the pressure introducing hole 57. An arbitrary conductor form connecting both ends of the valve casing 10 can be inserted into the passage 61. In the illustrated example, a signal line 63 for transmitting outputs of magnetic sensors 62A and 62B which detects approach of the magnet 16 provided in the spool 11 of the solenoid valve 1 is inserted into the passage 61.

As energization relay means for passing electricity between the solenoid valve 1 and the base 2, an electricity-supplying terminal 65 connected to the electricity-receiving terminal 28 is provided in the first housing 51 in the intermediate block 3 on the bonding surface with respect to the solenoid valve 1, and a connection terminal 66 connected to the connection terminal 42 is provided on the bonding surface with respect to the base 2. The electricity-supplying terminal 65 and the connection terminal 66 are electrically connected to each other through a printed board 67.

As signal transmitting means for transmitting output signals of the pressure sensor 60 and the magnetic sensor 62A and 62B to outside through the base, an electric circuit element is provided in the first housing 51. The electric circuit element transmits output signal of the pressure sensor 60 and output signals of the magnetic sensors 62A and 62B transmitted through the conductor in the passage 61 to the connection terminal 42 on the side of the base 2 through the printed board 67 and the connection terminal 66.

The printed board 67 comprises a semiconductor device 68 required for processing signals. The semiconductor device 68 outputs the outputs of the pressure sensor 60 and the magnetic sensors 62A and 62B as signals suitable to be sent through the signal line. The printed board 67 is fixed by a pressing lid 69 having the connection terminal 66. The printed board 67 is provided with an indicator 70 for indicating a switching delay of the spool 11 or operational failure such as non-operation state using a pilot lamp by checking a signal or the like at the time of start of energization to the solenoids 21A and 21B if necessary based on the outputs of the magnetic sensors 62A and 62B, so that the switching delay or the operational failure can visually be checked through an indication window 71.

The magnetic sensors 62A and 62B are provided in the second housing 52 such that the magnetic sensors are fitted into a recess 15b of the spacer 15 in the solenoid valve 1. With this design, the magnetic sensors 62A and 62B are brought closer to the magnet 16 on the spool 11 located in an insertion hole 15a of the spacer 15. The magnetic sensors 62A and 62B detect approach and separation of the magnet 16, thereby detecting an actual position of the spool 11. In the illustrated embodiment, the two magnetic sensors detects a position PA of the magnet when the pilot valve 20A is driven, a position PB of the magnet when the pilot valve 20A is driven, and a neutral position of the magnet. If the same purpose can be achieved, any number of magnetic sensors may be disposed. The same can be applied to the magnet 16. Moving positions of the spool 11 to be detected can also be set arbitrarily.

In the solenoid valve having a sensor of the above-described structure, monitor devices such as the pressure sensor, magnetic sensor and the like for monitoring whether input or output pressure in the solenoid valve is appropriate and a switching state of the spool are collected in the intermediate block 3 provided between the solenoid valve 1 and the base 2. Therefore, a structure for providing the monitor devices is simplified, possibility of erroneous wiring, erroneous assembling and the like is remarkably lowered, and assembling operation is facilitated which is economic. Since the monitor devices are sandwiched between the solenoid valve 1 and the base 2 by the intermediate block 3, the monitor devices are protected, and safety and reliability can be enhanced.

According to the present invention described in detail above, it is possible to provide a solenoid valve having a sensor in which monitor devices for monitoring whether input or output pressure in the solenoid valve is appropriate and a switching state of a valve body are collected to simplify the structure and to facilitate the assembling operation, thereby enhancing safety and reliability.

What is claimed is:

1. A solenoid valve having a sensor comprising a solenoid valve having a valve member for switching a flowing direction of pressurized fluid, a base having a plurality of flow paths for supplying and discharging pressurized fluid to and from ports of the solenoid valve, and an intermediate block disposed between the solenoid valve and the base, wherein the intermediate block is provided with a plurality of communication passages for respectively bringing the ports of the solenoid valve and the flow paths of the base into communication with each other, a conduit is provided at a position crossing the communication passages, a pressure introducing hole is provided in the conduit, a pressure introducing port which is in communication with the communication passage whose pressure is to be detected, and a pressure sensor for detecting pressure introduced in the pressure introducing hole through the pressure introducing port are provided in the pressure introducing hole.

2. A solenoid valve having a sensor according to claim 1, wherein a passage through which a conductive wire is inserted is provided in the conduit of the intermediate block.

3. A solenoid valve having a sensor according to claim 2, wherein a magnet is provided in the valve member of the solenoid valve, a magnetic sensor for detecting the magnet is provided in the intermediate block, a signal line connected to the magnetic sensor is pulled out to a predetermined place in the intermediate block through a passage for the conductive wire.

4. A solenoid valve having a sensor according to claim 3, wherein the intermediate block is provided with an indicator for indicating an operational failure of the valve member based on output of the magnetic sensor.

5. A solenoid valve having a sensor according to claim 3, wherein said intermediate block includes an intermediate block body and a first and second housings continuously formed on the intermediate block body, the intermediate block body is provided with a communication passage, a conduit and a pressure sensor, the first housing is provided therein with a relay terminal for electrically connecting the solenoid valve and the base with each other, and signal transmitting means for transmitting output signals of the pressure sensor and the magnetic sensor to outside, and the second housing is provided therein with the magnetic sensor.

* * * * *